(12) United States Patent
Dillon

(10) Patent No.: US 6,578,418 B2
(45) Date of Patent: *Jun. 17, 2003

(54) SIGHT GLASS

(76) Inventor: Robert J. Dillon, 5444 E. Twin Lake Blvd., Brooklyn Center, MN (US) 55429

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/198,316

(22) Filed: Nov. 23, 1998

(65) Prior Publication Data

US 2002/0000120 A1 Jan. 3, 2002

Related U.S. Application Data

(60) Provisional application No. 60/066,496, filed on Nov. 24, 1997.

(51) Int. Cl.[7] .............................................. G01F 23/02
(52) U.S. Cl. .............................. 73/327; 73/293; 73/323
(58) Field of Search ......................... 73/327, 293, 323; 250/900, 901, 902, 904; 116/227, 276

(56) References Cited

U.S. PATENT DOCUMENTS

| | | |
|---|---|---|
| 1,724,716 A | 8/1929 | Kryzanowsky |
| 1,883,971 A | 10/1932 | Kryzanowsky |
| 2,301,460 A | 11/1942 | Sauer .......................... 73/327 |
| 2,312,542 A | 3/1943 | Goodman .................. 73/327 X |
| 2,620,660 A | 12/1952 | Goldsmith .................... 73/293 |
| 2,943,530 A | 7/1960 | Nagel |
| 2,961,108 A | 11/1960 | Johnson ............... 306/459.5 X |
| 3,345,870 A | 10/1967 | Yoshinaga .................... 73/327 |
| 3,589,191 A * | 6/1971 | Kelch, Jr. ..................... 73/327 |
| 4,099,851 A | 7/1978 | Rethore ....................... 350/246 |
| D260,401 S | 8/1981 | Leopoldi .................... D16/135 |
| D271,308 S | 11/1983 | Leo ............................ D16/135 |
| D276,731 S | 12/1984 | Steiner ....................... D16/134 |
| 4,627,692 A | 12/1986 | Clegg .......................... 350/432 |
| 4,704,983 A | 11/1987 | Rung .......................... 116/276 |
| 4,878,383 A * | 11/1989 | Wiegand, Jr. et al. ......... 73/293 |
| 4,994,682 A * | 2/1991 | Woodside .................... 250/577 |
| 5,193,032 A | 3/1993 | Hirth .......................... 359/804 |
| D334,940 S | 4/1993 | Wolinsky .................... D16/134 |
| D351,176 S | 10/1994 | Agnew et al. .............. D16/135 |
| 5,381,264 A | 1/1995 | Wickholm et al. .......... 359/419 |
| 5,383,338 A * | 1/1995 | Bowsky et al. ................ 62/125 |
| D363,300 S | 10/1995 | Schwartz .................... D16/135 |
| 5,852,937 A * | 12/1998 | Westermeyer et al. ......... 62/125 |
| D406,598 S | 3/1999 | Grijalva ..................... D16/134 |

\* cited by examiner

Primary Examiner—Helen Kwok
Assistant Examiner—Rodney Frank (57) ABSTRACT

A sight glass apparatus has a liquid level indicator for identifying the level of a clear to slightly translucent liquid in tube by a change in color of the indicator. The indicator has a transparent body with a convex lens, and a concave lens at opposite ends of the body, and V-grooves open to opposite sides of the body. A moisture indicating medium on the body functions to identify the presence of water in refrigeration and air-conditioning systems.

25 Claims, 6 Drawing Sheets

SIGHT GLASS

This application claims benefit of Provisional Appln. No. 60/066,496 filed Nov. 24, 1997.

FIELD OF THE INVENTION

The invention relates to sight glasses providing optical information of the level of a liquid in an enclosed container. More particularly the invention is directed to sight glasses for visually monitoring the level of refrigerant in refrigeration and air-conditioning systems.

BACKGROUND OF THE INVENTION

The identification of the level of refrigerant charge in a refrigeration and air-conditioning system is critical and failure to do so often results in difficulties. Adding too much refrigerant to the system may cause operating inefficiency, system failure, and can lead to broken tubes, fittings, and component failure due to over pressurization. A misdiagnosis of an undercharged system caused by the leaking out of the refrigerant often delays repairs. Liquid indicating sight glasses are used to allow a person to visually monitor the level of the refrigerant in refrigeration and air-conditioning systems. These sight glasses require a light source to be read correctly. The reading must be done in close proximity to the sight glasses in order to determine the presence of refrigerant in the refrigeration and air-conditioning systems.

Liquid indicating sight glasses have historically consisted of flat glasses in gasketed metal fittings that allow the inspection of the interior of a vessel or tube. Refrigeration and air-conditioning sight glasses are manufactured by fusing glass into a steel fitting. A hand-held flashlight or other light emitting device is used to direct light through the glass to identify the presence of clear or slightly translucent fluids in a vessel or tube. The difficulty with these sight glasses is that, while they can clearly identify a partially full condition, where the sight glass is only partially covered, they can be easily misread when completely full or the level of the liquid is below the bottom of the sight glass. This misreading is of particular concern and most indicative of an inexperienced observer or technician.

Alternatives are presently available such as a sight glass that has a propeller inside the sight glass that rotates when there is liquid flow. There are also sight glasses that use a series of horizontal prisms on a front sight glass that distorts the image, such as the word "FULL", printed on a surface behind the sight glass. When the narrow space between the sight glass and the surface is filled with liquid, the word "FULL" is clearly visible.

R. L. Nagel in U.S. Pat. No. 2,943,530 discloses a liquid level indicator for providing an optical stimuli as a function of electrolyte level in a battery. The level indicator is a post joined to a battery cap. The lower end of the post has a lateral extension and a notch equal to the diameter of the post. The notch is defined by plane angular and longitudinal surfaces. The bottom of post is colored green. The outside lateral surface of the extension colored red is located in lateral alignment with the upper angular surface of the notch. When the notch is full of electrolyte, the color green will be observed by viewing the top of the cap. The color red is observed when the level of the electrolyte is below the upper angular surface of the notch.

SUMMARY OF THE INVENTION

The invention is an apparatus termed a sight glass, for providing visual information concerning the presence of liquid n a structure having a chamber for holding a liquid and the level of liquid in the chamber. The structure is a tube, vessel or a hosing in a fluid line accommodating a liquid, such as a refrigerant. The housing has a chamber for holding the liquid. The presence of liquid and level of liquid in the fluid line is determined by the level of liquid in the chamber. The chamber is enclosed with a cap having a window to allow visual inspection of the chamber and a liquid level indicator located in the chamber. In one embodiment of the liquid level indicator, a convex head on the indicator closes an opening in the cap whereby the liquid level indicator is directly viewed to determine the presence of liquid an the level of liquid in the chamber.

The liquid level indicator has a transparent body of glass, plastic, fused quartz or ceramic materials. The viewing end of the body has a convex lens to enhance illumination of light into the body. The opposite end of the boy has a colored member which provides colored visual information of the presence and level of liquid in the chamber. Prismatic indentations in opposite sides of the body reflect light laterally when exposed to a gas and allow light to pass through the body when exposed to liquid. The light reflects from the colored member back through the body providing colored visual information concerning the presence of liquid in the chamber. The prismatic indentation comprises a pair of longitudinally spaced V-grooves in opposite sides of the body that intersect the longitudinal center line of the body. The V-grooves overlap at their apexes and have a radial depth of about one third the diameter of a cylindrical transparent body. In one embodiment of the liquid level indicator the body has two pairs of V-grooves. Each pair of V-grooves has a groove on opposite sides of the body. The second pair of V-grooves is circumferentially located 90 degrees from the first pair of V-grooves. This liquid level indicator provides visual information concerning full, empty, three quarter, half and one-quarter liquid conditions of the levels in the chamber.

DESCRIPTION OF PREFERRED EMBODIMENTS OF THE INVENTION

Figure 1:
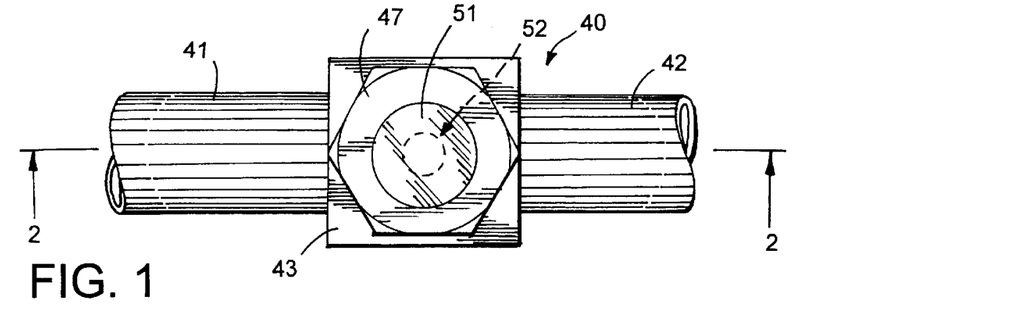
FIG. 1 is a top plan view of a sight glass apparatus joined to tubes for accommodating fluids, such as liquid and gas refrigerants.
Figure 2:
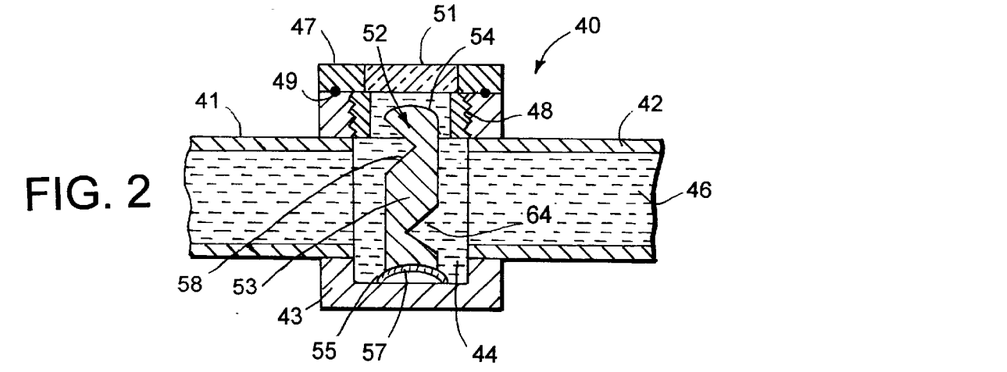
FIG. 2 is a sectional view taken along line 2—2 of FIG. 1.

A sight glass apparatus 40 of the invention, shown in FIGS. 1 and 2, is joined to tubes 41 and 42 for accommodating a liquid 46 and gas, such as a refrigerant in a refrigeration or air-conditioning system. An example of liquid 46 is refrigerant R134A which changes phases from a liquid to a gas and back to a liquid in a refrigeration cycle. The following description of the sight glass apparatus is directed to liquids used in refrigeration and air-conditioning systems. The sight glass apparatus and liquid level indicator described herein are applicable to containers and fluid systems that accommodate clear and slightly translucent liquids. Apparatus 40 has a generally square housing 43 with an internal chamber 44. Opposite sides of housing 43 have openings for the ends of tubes 41 and 42 to allow liquid 46 to flow through chamber 44. The chamber 44 is in substantial horizontal alignment with the passages of tubes 41 and 42. The level of liquid 46 in chamber 44 coincides with the level of liquid in the tube passages due to the horizontal alignment of chamber 44 and tubes 41 and 42. The top of housing 43 is closed with a cap 47. Cap 47 has threads 48 that turn into the top of housing 43 to allow cap 47 to be attached to and removed from housing 43. An annular seal or O-ring 49 located between cap 47 and housing 43 maintains a tight seal between cap 47 and housing 43 to prevent escape of liquid and gases from chamber 44. Cap 47 has a central transparent disk or window 51 allowing visual inspection of liquid in chamber 44 and a liquid level indicator 52. Disk 51 can be clear glass or plastic fused to the annular metal portion of cap 47.

Liquid level indicator 52 located within chamber 44 functions provide visual information concerning the presence of liquid and gas in chamber 44 and the level of liquid in chamber 44. Indicator 52 comprises a cylindrical body 53 of transparent material, such as clear glass, transparent plastic, fused quartz or transparent ceramic materials. Body 53 has a convex top lens and bottom concave lens. The bottom end 56 of body 53 has a concave configuration covered with a colored coating, membrane, or film 57. Film 57 is colored green. Other colors can be used to provide film 57 with a color image that can be viewed through window 51 and body 53. Film 57 can be paint or a colored plastic sheet joined to the concave bottom end 56 of body 53. The bottom end 56 of body 53 is secured with an adhesive 55 or other bonding material to the bottom of housing 43. Adhesive 55 holds body 53 in an upright position in chamber 44.

Figure 3:
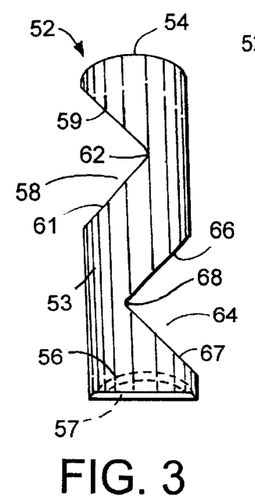
FIG. 3 is a front elevational view of the fluid level indicator in the sight glass apparatus of FIGS. 1 and 2.
Figure 4:
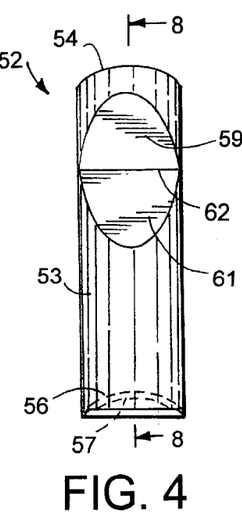
FIG. 4 is a side elevational view of the left side of FIG. 3.
Figures 5, 6, 7:
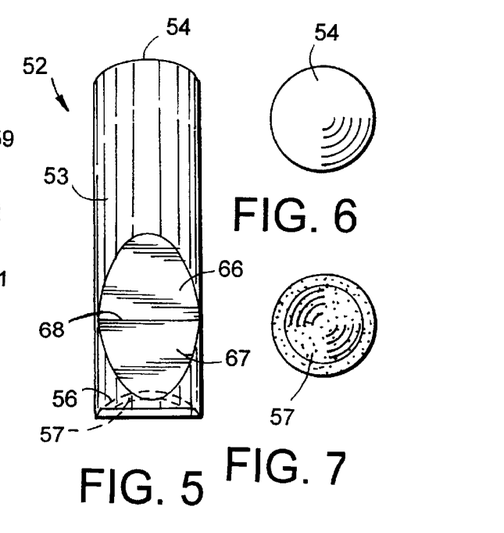
FIG. 5 is a side elevational view of the right side of FIG. 3.
FIG. 6 is a top plan view of FIG. 3.
FIG. 7 is a bottom plan view of FIG. 3.
Figures 8, 9:
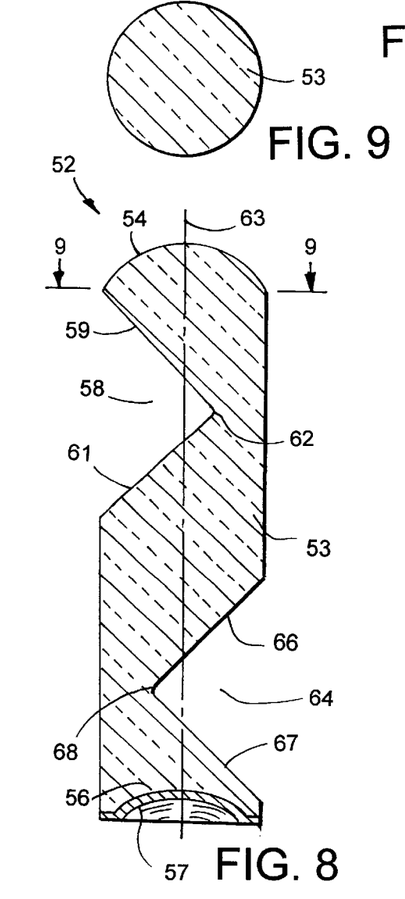
FIG. 8 is an enlarged sectional view taken along the line 8—8 of FIG. 4.
FIG. 9 is a sectional view taken long the line 9—9 of FIG. 8.
Figures 10, 13:
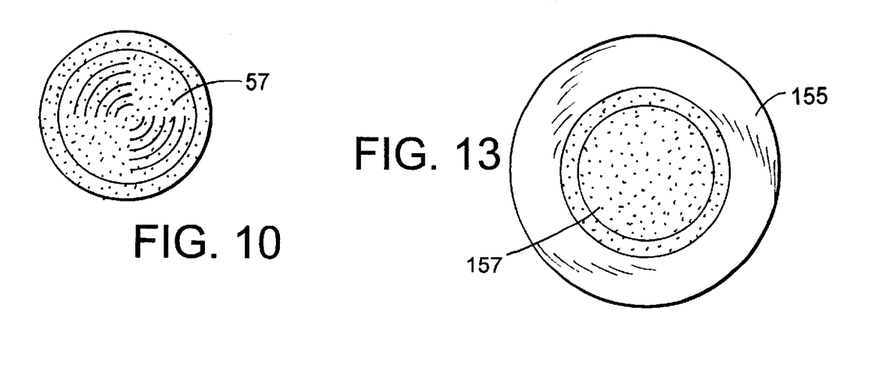
FIG. 10 is a bottom plan view of FIG. 8.
FIG. 13 is a bottom plan view of FIG. 11.

As shown in FIGS. 3, 4, and 8, body 53 has a pair of vertically spaced V-shaped grooves 58 and 64 located on opposite sides of body 53. Grooves 58 and 64 are prismatic indentations in diametric opposite sides of body 53. The grooves 58 and 64 are identical in shape and size and longitudinally spaced from each other. The body can have arcuate, semicircular, or elliptical shapes forming the grooves or recesses comprising the prismatic indentations. The upper end of body 53 has inclined flat surfaces 59 and 61 that coverage to an apex 62 defining groove 58. Surfaces 59 and 61 extend past the central vertical axis 63 of body 53. The thickness of body 53 between apex 62 and adjacent side wall of body 53 is about one third the diameter of body 53. Surface 59 extends upwardly and outwardly from apex 62 at an angle of 45 degrees relative to axis 63. Surface 61 extends downwardly and outwardly from apex 62 at an angle of 45 degrees relative to axis 63. The angle between surfaces 59 and 61 is 90 degrees. The lower end of body 53 has inclined flat surfaces 66 and 67 converging to an apex 68 defining second groove 64. Surfaces 66 and 67 extend through center line 63 of body 53 locating apex 68 laterally of center line 63. The thickness of body 53 between apex 68 and adjacent side wall of body 53 is about one-third the diameter of body 53. The angle between surfaces 66 and 67 are 90 degrees. Each surface 66 and 67 extends outwardly from apex 68 at an angle of 45 degrees from the axis 63 of body 53. Surface 66 is substantially parallel to surface 61. Surface 67 is substantially parallel to surface 59. Surfaces 59, 61, 66 and 67 are generally flat and polished. The angles between surfaces 59, 61 and 66, 67 can vary from the right angles shown in FIGS. 2, 3 and 8.

Figures 23, 24, 25, 26, 27, 28, 29:
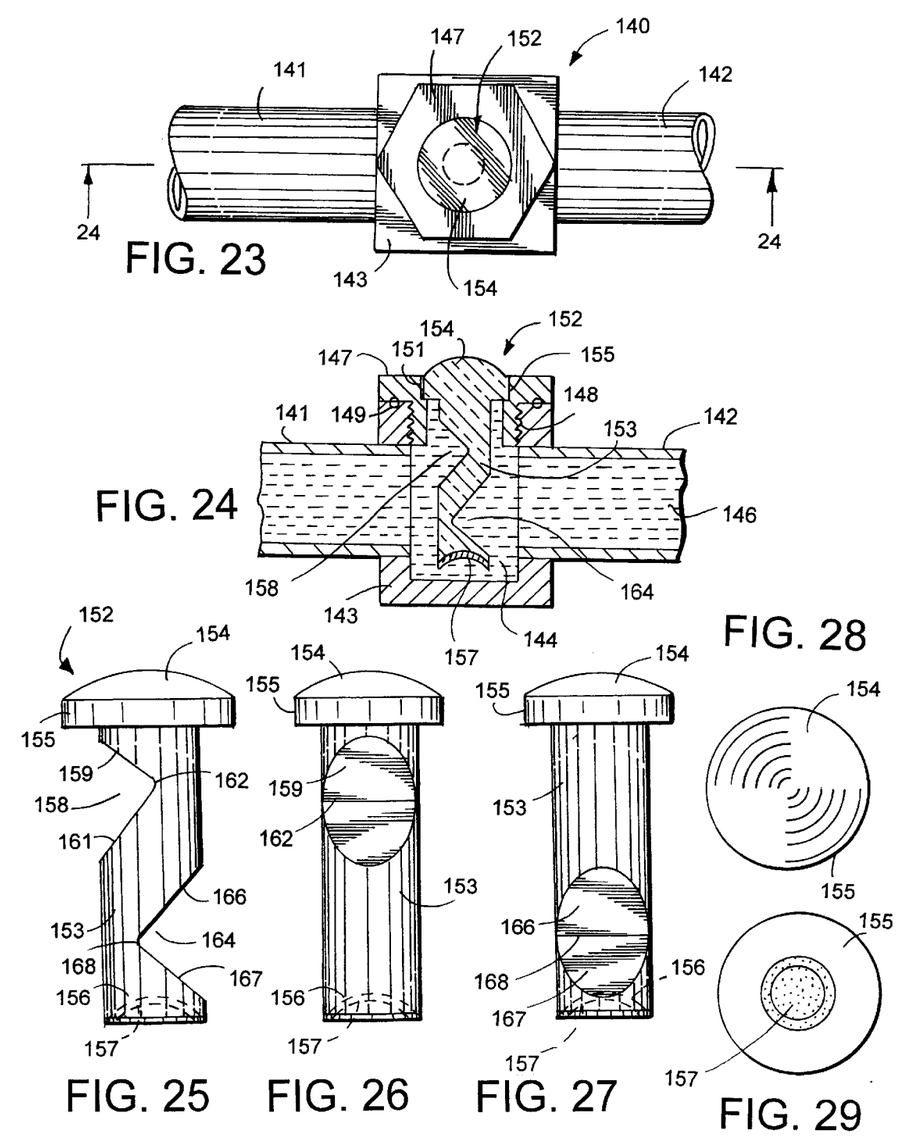
FIG. 23 is a top plan view of a sight glass apparatus joined to tubes for accommodating fluids, such as liquid and gas refrigerants.
FIG. 24 is a sectional view taken along line 24—24 of FIG. 23.
FIG. 25 is a front elevational view of the fluid level indicator in the sight glass apparatus of FIGS. 23 and 24.
FIG. 26 is a side elevational view of the left side of FIG. 25.
FIG. 27 is a side elevational view of the right side of FIG. 25.
FIG. 28 is a top plan view of FIG. 25.
FIG. 29 is a bottom plan view of FIG. 25.

A modification of the sight lass apparatus 140, shown in FIGS. 23 and 24, has a liquid level indicator 152 mounted on cap 147 and extended down into chamber 144. The parts of sight glass apparatus 140 that corresponds to sight glass apparatus 40 have the same reference numbers with a prefix 1. Sight glass apparatus 140 is joined to tubes 141 and 142 for accommodating a liquid 146, such as a refrigerant in a refrigeration or air-conditioning system. Apparatus 140 has a generally square housing 143 with an internal chamber 144. Opposite sides of housing 143 have openings for the ends of tubes 141 and 142 to allow liquid 146 to flow through chamber 144. The chamber 144 is in substantial horizontal alignment with the passages of tubes 141 and 142.

The level of liquid 146 in chamber 144 coincides with the level of liquid in tube passages due to the horizontal alignment of chamber 144 and tubes 141 and 142. The top of housing 143 is closed with a cap 147. Cap 147 has threads 148 that turn into the top of housing 143 to allow cap 147 to be attached to and removed from housing 143. An annular seal or O-ring 149 located between cap 147 and housing 143 maintains a tight seal between cap 147 and housing 143 to prevent escape of liquid and gases from chamber 144. Cap 147 has a central circular opening 151. Liquid level indicator 152 has a body 153 extended downwardly through opening 151 into chamber 144. Body 153 is a transparent cylindrical member joined to a head 155. The head has a convex outer end 154 located across the entire top of head 155. The convex shape of the head is a convex lens that enhances the visual inspection of the body 153 and level of liquid in chamber 144. Head 155 closes opening 151. The outer peripheral edge of head 155 is secured to cap 147 whereby liquid level indicator 152 is mounted on cap 147. Head 155 can be fused to cap 147. Body 153 and head 155 are one-piece structures of transparent material, such as clear glass, transparent plastic, fused quartz and transparent ceramic material.

Liquid level indicator 152 located within chamber 144 functions provide visual information concerning the presence of liquid in chamber 144 and the level of liquid in chamber 144. Indicator 152 comprises a cylindrical body 153 of transparent material, such as clear glass, transparent plastic, fused quartz, and transparent ceramic materials. Body 153 has a convex curved top end 154 providing a convex lens. The bottom end 156 of body 153 has a concave configuration covered with a coating, membrane, or film 157. Film 157 is colored green. Other colors can be used to provide film 157 with a color image that can be viewed through end 154. Film 157 can be paint or a colored plastic sheet joined to the concave bottom end 156 of body 153.

Figure 11:
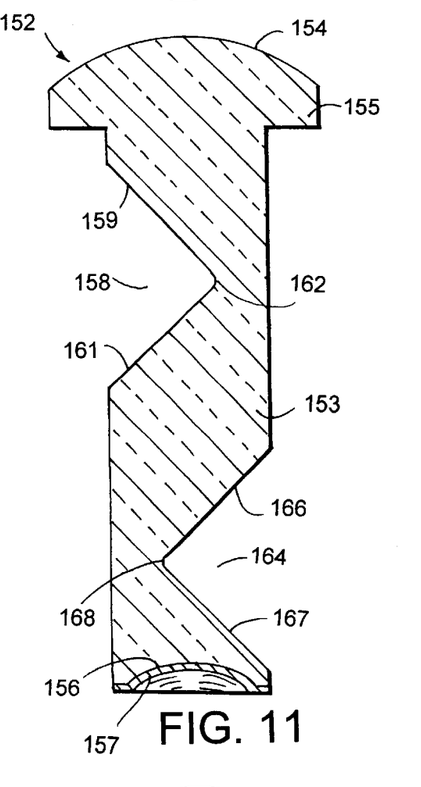
FIG. 11 is a sectional view similar to FIG. 8 of a first modification of the fluid level indicator.
Figure 12:
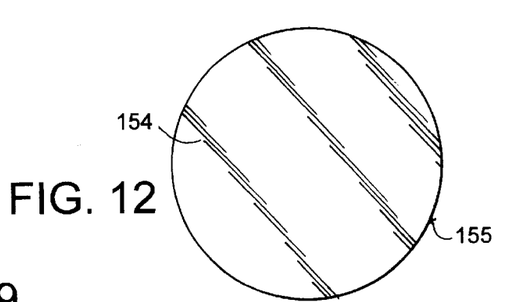
FIG. 12 is a top plan view of FIG. 11.

As shown in FIGS. 12, 13, 25, 26 and 27, body 153 has a pair of vertically spaced V-shaped grooves 158 and 164 located n opposite sides of body 153. Grooves 158 and 164 are prismatic indentations in diametric longitudinal spaced opposite sides of body 153. The shape and size of grooves 158 and 164 are identical. Body 153 can have arcuate, semicircular or elliptical shaped recesses forming grooves comprising the prismatic indentations. The upper end of body 153 has inclined flat polished surfaces 159 and 161 that coverage to an apex 162 defining groove 158. Surfaces 159 and 161 extend past the central vertical axis 163 of body 153. The thickness of body 153 between apex 162 and adjacent side wall of body 153 is about one-third the diameter of body 153. Surface 159 extends upwardly and outwardly from apex 162 at an angle of 45 degrees relative to axis 163. Surface 161 extends downwardly and outwardly from apex 162 at an angle of 45 degrees relative to axis 163. The angle between surfaces 159 and 161 are 90 degrees. The lower end of body 153 has inclined flat polished surfaces 166 and 167 converging to an apex 168 defining second groove 164. Surfaces 166 and 167 extend through center line 163 of body 153 locating apex 168 laterally of center line 163. The thickness of body 153 between apex 168 and adjacent side wall of body 153 is about one-third the diameter of body 153. The angle between surfaces 166 and 167 is 90 degrees. Each surface 166 and 167 extends outwardly from apex 168 at an angle of 45 degrees from the axis 163 of body 153. Surface 166 is substantially parallel to surface 161. Surface 167 is substantially parallel to surface 159. The angles between surfaces 159, 161 and 166, 167 can vary from the right angles shown in FIGS. 11, 24 and 25.

Figure 14:
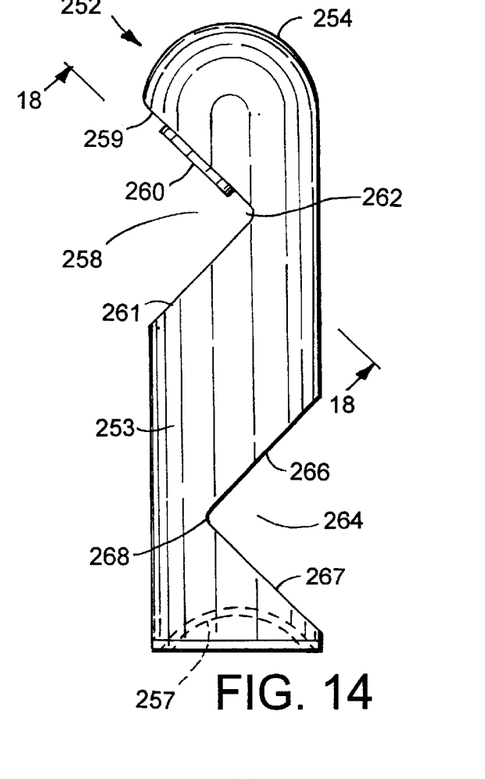
FIG. 14 is a front elevational view of a second modification of the fluid level indicator.
Figure 15:
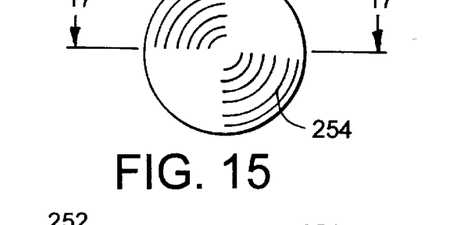
FIG. 15 is a top plan view of FIG. 14.
Figure 16:
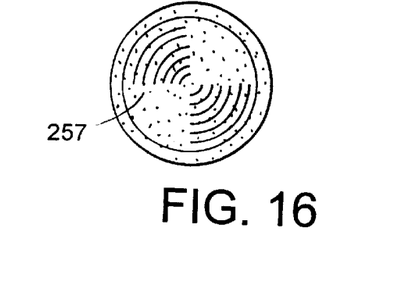
FIG. 16 is a bottom plan view of FIG. 14.
Figure 17:
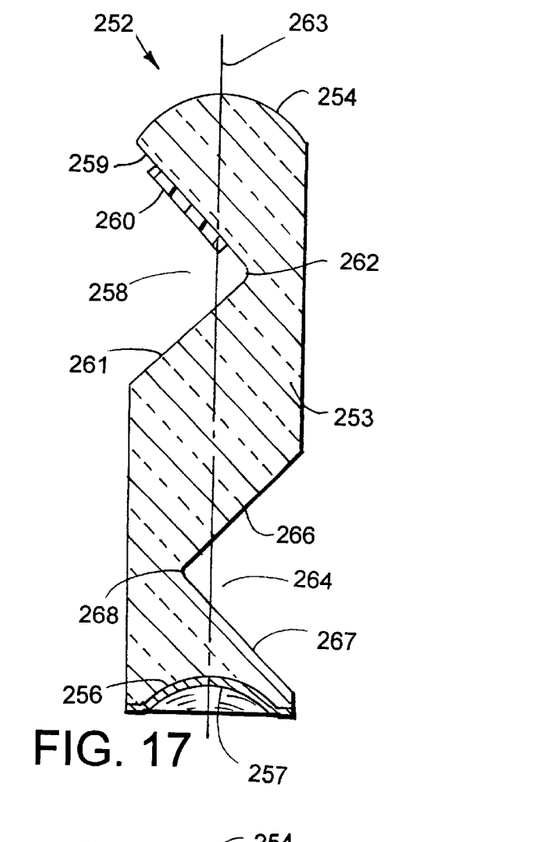
FIG. 17 is a sectional view taken along line 17—17 of FIG. 15.

Another modification of the liquid level indicator, indicated generally at 252 in FIGS. 14 and 17, is adopted to be located within chamber 44 to provide visual information concerning the level of liquid, the presence of liquid and water in chamber 44. Water in refrigeration systems freezes at the coldest location to ice up the system which reduces efficiency and termination of the refrigeration cycle. The water also produces acids in the system which reduces operation life of the refrigeration equipment. The parts of indicator 252 that correspond to the same parts of indicator 52 have the same reference numbers with the prefix 2. Indicator 252 comprises a cylindrical body 253 of transparent material, such as clear glass, plastic, fused quartz and ceramic materials. Body 253 has a convex curved top end 254 providing a convex lens. The bottom end 256 of body 253 has a concave configuration covered with a color coating, membrane or film 257. Film 257 is colored green. Other colors can be used to provide film 257 with a color image that can be viewed through end 254. Film 257 can be paint or a colored plastic sheet joined to the concave bottom end 256 of body 253.

As shown in FIGS. 14 and 17, body 253 has a pair of vertically spaced V-shaped grooves 258 and 264 located n opposite sides of body 253. Grooves 258 and 264 are prismatic indentations in diametric longitudinal spaced opposite sides of body 253. The shape and size of grooves 258 and 264 are identical. Body 253 can have arcuate, semicircular or elliptical shaped recesses forming grooves comprising the prismatic indentations. The upper end of body 253 has inclined flat polished surfaces 259 and 261 that coverage to an apex 262 defining groove 258. Surfaces 259 and 261 extend past the central vertical axis 263 of body 253. The thickness of body 253 between apex 262 and adjacent side wall of body 253 is about one-third the diameter of body 253. Surface 259 extends upwardly and outwardly from apex 262 at an angle of 45 degrees relative to axis 263. Surface 261 extends downwardly and outwardly from apex 262 at an angle of 45 degrees relative to axis 263. The angle between surfaces 259 and 261 is 90 degrees. The lower end of body 253 has inclined flat surfaces 266 and 267 converging to an apex 268 defining second groove 264. Surfaces 266 and 267 extend through center line 263 of body 253 locating apex 268 laterally of center line 263. The thickness of body 253 between apex 268 and adjacent side wall of body 253 is about one-third the diameter of body 253. The angle between surfaces 266 and 267 is 90 degrees. Each surface 266 and 267 extends outwardly from apex 268 at an angle of 45 degrees from the axis 263 of body 253. The angles between surfaces 259, 261 and 266, 267 can vary from the right angles shown in FIGS. 14 and 17. Surface 266 is substantially parallel to surface 261. Surface 267 is substantially parallel to surface 259.

Figure 18:
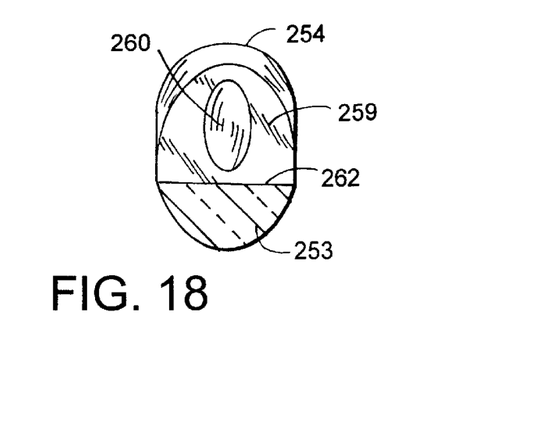
FIG. 18 is a sectional view taken along line 18—18 of FIG. 14.
Figures 19, 20, 21, 22:
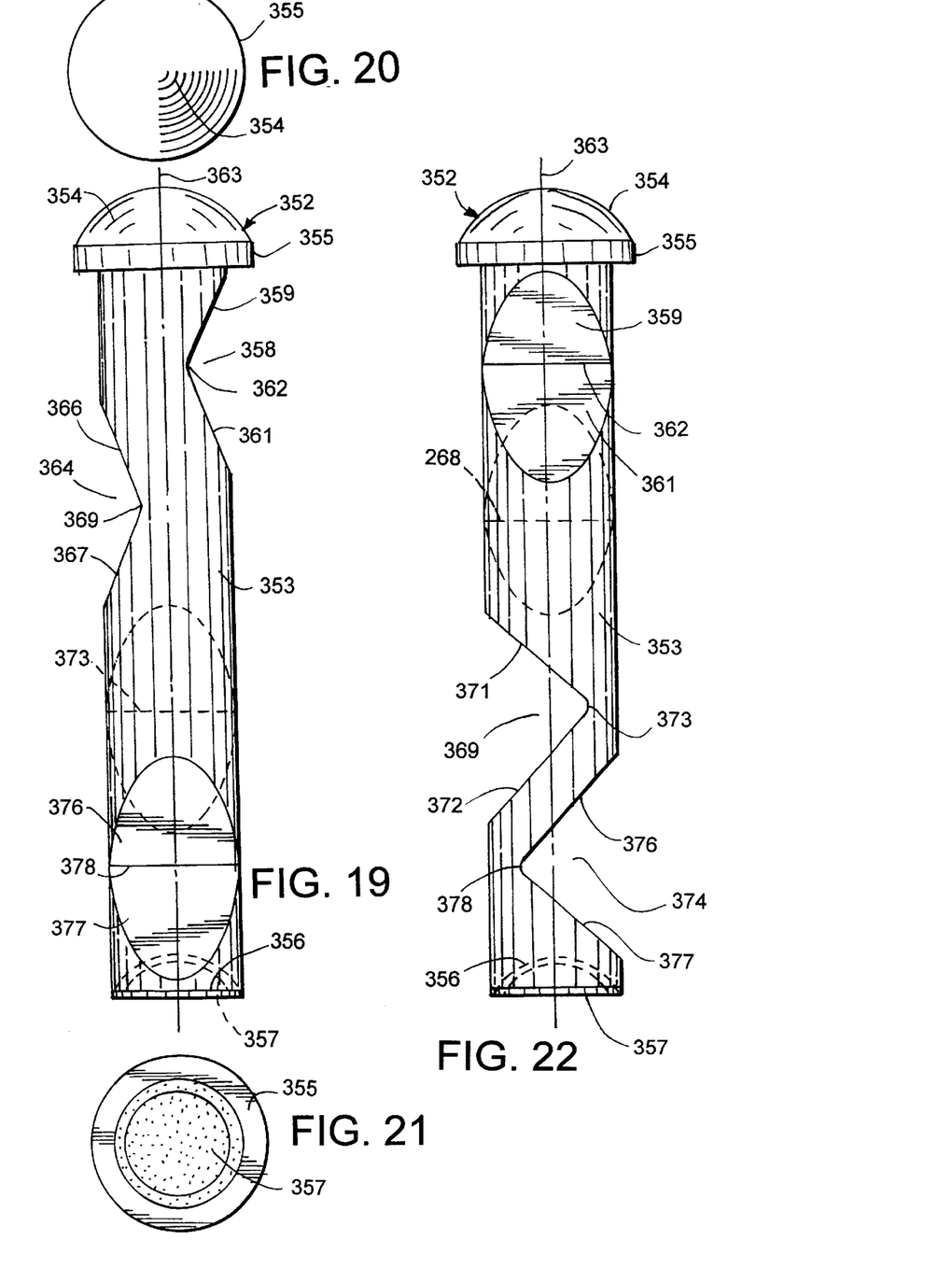
FIG. 19 is a front elevational view of a third modification of the fluid level indicator.
FIG. 20 is a top plan view of FIG. 19.
FIG. 21 is a bottom plan view of FIG. 19.
FIG. 22 is a side elevational view of FIG. 19.

A flat pad 260 secured to surface 259, as shown in FIGS. 14, 17, and 18 is a member having a chemical base or material that changes color when exposed to water. Water reacts with the chemical compounds in pad 260 to change the color of pad 260 from green to yellow or from pink to blue. The color yellow observed through end 254 informs the person that there is water in the refrigeration system. Pad 260 is a conventional porous member having water sensitive chemicals that change color in the presence of water.

A further modification of the liquid level indicator, indicated generally at 352 in FIGS. 19 to 22, has four V-grooves or recesses 358, 364, 369 and 374 in body 353 providing prismatic indentations. The parts of liquid level indicator 352 that correspond to the parts of level indicator 52 have the same reference numbers with the prefix 3.

The body 353 of indicator 352 is a transparent cylindrical member made of clear glass, plastic, fused quartz or ceramic material. The top of body 353 is joined to a circular head 355 having a convex top surface 354. Head 355 is a convex lens that focuses light into body 353 which enhances the visual reading of indicator 352. The upper portion of body 353 has a first pair of V-grooves 358 and 364. A second pair of V-grooves 369 and 374 are located in the lower portion of body 353. V-grooves 369 and 374 are circumferentially oriented 90 degrees relative to V-grooves 358 and 364. Body 353 has converging flat polished surfaces 359, 361 and 366, 367 forming grooves 358 and 364 on opposite sides of body 353. The apexes 362 and 368 are located on opposite sides of longitudinal center line 363 of body 353 to allow reading of the liquid level with light. The lower end portion of body 353 has converging flat polished surfaces 371, 372 and 376, 377 forming grooves 369 and 374 which extend across center line 363. The apex's 373 and 378 of grooves 369 and 374 are located on opposite sides of center line 363. The bottom 356 of body 353 has a concave shape and is covered with a colored coating, membrane or film 357. Grooves 358, 364, 369 and 374 are prismatic indentations in body 353. Grooves 358 and 364 are identical in size and shape and open to opposite sides of body 353. Grooves 358 and 364 are relatively shallow as they do not intersect the center line or vertical axis 363 of body 353. The shape and size of grooves 369 and 374 are identical. Each groove 369 and 374 cross the center line 363 and have a depth of about two-thirds the diameter of the body 353. Body 353 can have arcuate, semicircular or elliptical shaped recesses forming grooves comprising the prismatic indentations.

Figure 30:
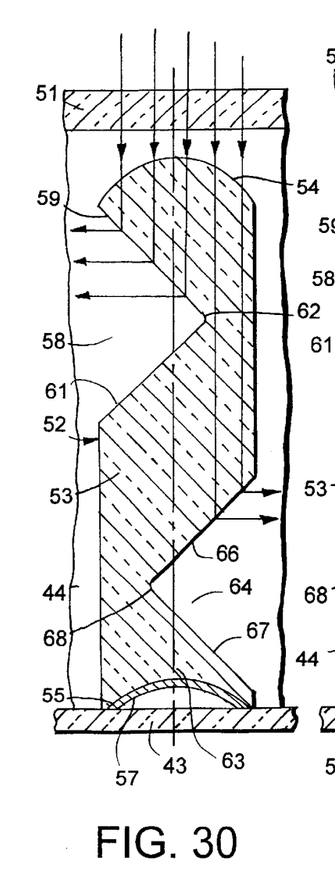
FIG. 30 is a sectional view similar to FIG. 8 of the fluid level indicator with visual light lines showing the empty fluid chamber.

Referring to FIG. 30, chamber 44 is devoid of liquid and filled with a gas. Light entering the top lens surface 54 of body 53 is focused into and propages down transparent body 53 and reflected laterally from surfaces 59 and 66 as shown by light past arrows 69 and 71 into the gas in chamber 44. The light does not illuminate colored film 57. The color of film 57 is not visible or seen by a person viewing window 51 and lens surface 54. When the color of film 59 is not observed, as shown in FIG. 31, there is not liquid or a very small amount of liquid in chamber 44.

Figure 31:
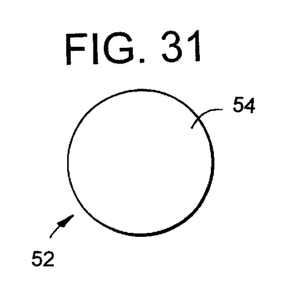
FIG. 31 is a top plan view of the fluid level indicator of FIG. 30.
Figure 32:
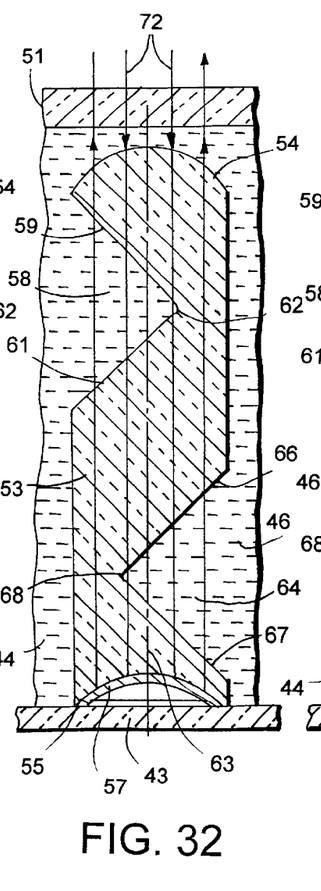
FIG. 32 is a sectional view similar to FIG. 8 of the fluid level indicator with visual light showing the full fluid chamber.
Figure 33:
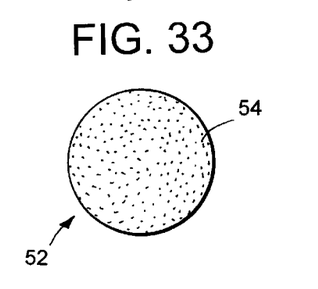
FIG. 33 is a top plan view of the fluid level indicator of FIG. 32.
Figure 34:
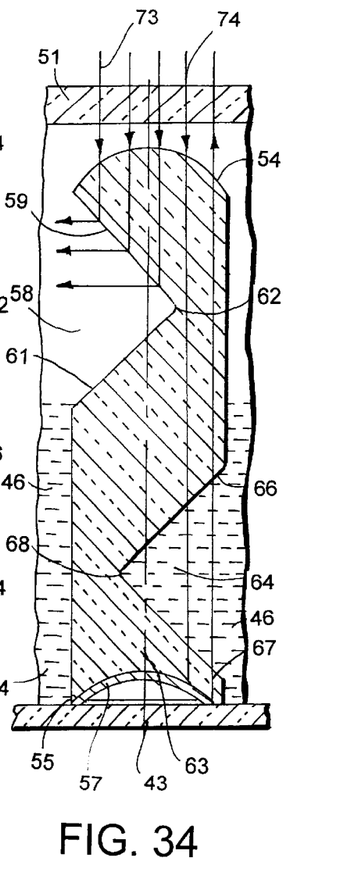
FIG. 34 is a sectional view similar to FIG. 8 of the fluid level indicator with visual light lines showing the partly full fluid chamber.

As shown in FIG. 31, when chamber 44 is full of liquid 46 the light propagates down body 53 to concave lens end 56 as shown by arrows 72. The light does not substantially reflect from surfaces 59, 61, 66 and 67. The color of film 57 is visible as the light is reflected up from the bottom end 56 of body 53. The view colored film 57, as shown in FIG. 33, revels the presence of liquid 46 in chamber 44 and that chamber 44 is full of liquid 46.

Figure 35:
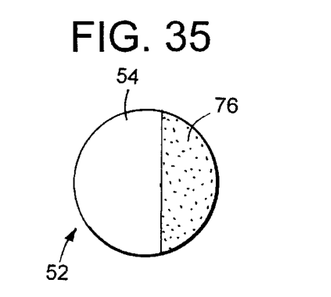
FIG. 35 is a top plan view of the fluid level indicator of FIG. 34.

Referring to FIG. 35, chamber 44 is partly filled with liquid 46 and a gas. Light propages down body 53 along light paths, shown by arrows 73 and 74. The light directed to surface 59 is reflected laterally into the gas in chamber 44. The light passing groove 58 makes optical contact with colored film 57 and reflects back through body so that a semicircular pattern of color 76, shown in FIG. 35, is viewed through window 51. The semicircular pattern of color 76 informs the viewer that the level of liquid in chamber 44 is below groove 58 whereby the chamber 44 is partly filled with liquid.

The liquid level indicator 152, shown in FIGS. 24 to 29, is used without a window on cap 147. The head 155 of indicator 152 closes opening 151 in cap 147 and provides a large convex lens that increases the amount of light that enters body 153. The increased amount of light enhances the viewing and reading of the liquid level indicator 152. The empty, full, and partly full liquid level conditions in chamber 144 are viewed the same as the light and color viewed in liquid level indicator 52 as shown in FIGS. 30 to 35.

The liquid level indicator shown in FIGS. 19 to 22 is used to view multiple levels of liquid in a chamber, such as chamber 44. The viewed colors reveal fill, three quarter, one half, one quarter and empty conditions of the liquid in the chamber. The surfaces 359, 366, 371 and 376 reflect light laterally when they are not covered with liquid. When the surface 359, 366, 371 and 376 are covered with liquid the light passes through the liquid and reflects back into body 353 whereby all or part the color of film 357 can be viewed according to the level of the liquid in the container chamber accommodating the liquid level indicator 352.

The presence of moisture or water in chamber 44 can be visually read continuously regardless of the level of liquid in chamber 44. As shown in FIGS. 14, 17 and 18, moisture indicator pad 260 secured to top surface 259 changes color from yellow to green or from pink to blue when the moisture sensitive chemicals or materials of pad 260 are subjected to water. The color of pad 260 is readily viewed since it is located close to the top of liquid level indicator 252. Liquid level indicators 152, 352 can be provided with moisture indicating pads similar to pad 260.

There has been shown and described several embodiments of the sight glass apparatus and liquid level indicator of the invention. Changes in structures and materials and uses of the apparatus may be made by persons skilled in the art without departing from the invention. The invention is defined in the following claims.

What is claimed is:

1. An apparatus for providing information of the presence of liquid in a structure containing a liquid comprising: a housing adapted to be connected to the structure for accommodating said liquid, said housing having a chamber for holding said liquid therein, said housing having an opening into the chamber, means having a window mounted on the housing totally closing the opening for allowing external light into the chamber and facilitating a person to view the chamber, a transparent liquid level indicator located within the chamber having means providing prismatic indentations along the length thereof for reflecting light laterally when exposed to a gas in the chamber and transmitting light along the indicator when exposed to a liquid, and means mounting the indicator on the housing to locate the indicator in an upright position alignment with the window, said liquid level indicator comprising a linear transparent body having a first viewing end, a second end, and a side wall between the first and second ends, said side walls having said means providing prismatic indentations for reflecting light laterally when exposed to a gas in the chamber and transmitting light along the body when exposed to a liquid, a convex lens on the first viewing end of the body for directing external light along the length of the body, and a color member on the second end of the body for reflecting the light transmitted through the body back through the body and convex lens to provide color visual information regarding the presence and level of liquid in the chamber.

2. The apparatus of claim 1 including: means mounted on the liquid level indicator providing visual information as to the presence of water in the chamber.

3. An apparatus for providing information of the level of liquid in a structure containing a liquid comprising: a housing adapted to be connected to the structure for accommodating said liquid, said housing having a chamber for holding said liquid therein, said housing having an opening into the chamber, means having a window mounted on the housing totally losing the opening for allowing external light into the chamber and facilitating a person to view the chamber, a transparent liquid level indicator located within the chamber having means providing prismatic indentations along the length thereof for reflecting light laterally when exposed to a gas in the chamber and transmitting light along the indicator when exposed to a liquid, means mounting the indicator on the housing to locate the indicator in an upright position alignment with the window, said liquid level indicator comprising a linear transparent body having a first viewing end, a second end, and a side wall between the first and second ends, said side walls having said means providing prismatic indentations for reflecting light laterally when exposed to a gas in the chamber and transmitting light along the body when exposed to a liquid lens means on the first end of the body for increasing the intensity of the light directed into the body to enhance reading of the visual information of the level of the liquid in the chamber, and a color member on the second end of the body for reflecting the light transmitted through the body back through the body and lens means to provide color visual information regarding the presence and level of liquid in the chamber.

4. The apparatus of claim 3 including: surfaces in the side wall of the body providing said prismatic indentations, the surfaces being generally flat and located at angles relative to the longitudinal axis of the body in opposite portions of the side wall to form V-grooves in the opposite portions of the side wall of the body.

5. The apparatus of claim 4 wherein: the surfaces forming the V-grooves intersect the longitudinal axis of the body and locate the apexes of the grooves in overlapping relationship.

6. The apparatus of claim 3 including: a pad mounted on a surface having means responsive to water to provide visual information of the presence of water in the chamber.

7. The apparatus of claim 3 wherein: said means providing prismatic indentations having first surfaces defining a first pair of grooves in opposite sides of the side wall and second surfaces defining a second pair of grooves in opposite sides of the side wall, said second pair of grooves being circumferentially orientated 90 degrees from the first pair of grooves, said grooves providing said prismatic indentations for reflecting light laterally when exposed to a gas and transmitting light along the body when exposed to liquid thereby providing said visual information as to the level of liquid in the chamber.

8. The apparatus of claim 7 wherein: the grooves are V-grooves.

9. The apparatus of claim 3 wherein: the lens means includes a convex lens joined to the first end of the body to enhance the illumination of the light directed into the body.

10. The apparatus of claim 3 including: means mounted on the liquid level indicator providing visual information as to the presence of water in the chamber.

11. An apparatus for providing information of the presence of a liquid in a structure containing a liquid comprising: means adapted to be connected to the structure for accommodating said liquid said means having a chamber for holding said liquid and an opening in communication with the chamber, a liquid level indicator located within the chamber providing visual information regarding the presence of said liquid in the chamber and the level of said liquid in the chamber, said indicator having a transparent head, cap means supporting an surrounding the head mounted on the means having the chamber whereby the cap means and head closes the opening therein, an elongated linear transparent body joined to the head extended downwardly into the chamber, said body having a side wall and an end opposite the head, and a color member on said end for reflecting light back through the body to provide color viewing information regarding the presence of said liquid in the chamber, said side wall having a plurality of surfaces providing at least a pair of prismatic indentations in opposite sides of the side wall spaced along the body above said end for reflecting light in the body laterally when exposed to a gas in the chamber and transmitting light along the body when exposed to a liquid whereby the light reflected back through the body from the color member provides visual information as to the level of said liquid in the chamber and the presence of said liquid in the chamber, said head having a convex outer surface forming a convex lens to increase the intensity of the light directed into the body to enhance reading of the visual information of the level of the liquid in the chamber.

12. The apparatus of claim 11 including: means mounted on the liquid level indicator providing visual information as to the presence of water in the chamber.

13. The apparatus of claim 11 wherein: the surfaces are generally flat and located at angles relative to the longitudinal axis of the body in opposite portions of the side wall to form V-grooves in the opposite portions of the side walls of the body.

14. The apparatus of claim 13 wherein: the surfaces forming the V-grooves intersect the longitudinal axis of the body and locate the apexes of the grooves in overlapping relationship.

15. The apparatus of claim 13 including: a pad mounted on a surface having means responsive to water to provide visual information of the presence of water in the chamber.

16. The apparatus of claim 11 wherein: said plurality of surfaces comprising a first pair of grooves in opposite sides of the side wall and a second pair of grooves in opposite sides of the side wall, said second pair of grooves being circumferentially orientated 90 degrees from the first pair of grooves, said first and second pair of grooves providing the prismatic indentations for reflecting light laterally away from the body when exposed to a gas and transmitting light along the body when exposed to said liquid.

17. The apparatus of claim 16 wherein: the grooves are V-grooves.

18. The apparatus of claim 16 including: means mounted on the liquid level indicator providing visual information as to the presence of water in the chamber.

19. The apparatus of claim 16 including: a pad mounted on a surface of the first paid of grooves having means responsive to water to provide colored visual information of the presence of water in the chamber.

20. In combination a structure having a generally horizontal passage for accommodating a liquid, an apparatus connected to the structure providing visual information of the level of liquid in the passage of the structure, said apparatus having a housing connected to the structure, said housing having an internal chamber open to said passage for holding liquid at the same level as the liquid in the passage, said housing having a top wall with an opening open to said chamber, a liquid level indicator located within the chamber having a transparent head, and a linear transparent body joined to the head, said body having a bottom end and a side wall between the head and the bottom end, means mounting the head on the top wall of the housing closing the opening therein and locating the body in a vertical position in the chamber, said side wall having a plurality of surfaces spaced along the body providing prismatic indentations for reflecting light laterally when exposed to gas within the chamber and transmitting light along the transparent body when exposed to said liquid in the chamber, said head having a convex outer surface forming a convex lens to increase the intensity of the light directed into the body to enhance reading of the visual information of the level of the liquid in the chamber, and a member on the second end of the body for reflecting the light transmitted through the body back through the body and convex lens to provide visual information regarding the presence and level of liquid in the chamber and passage.

21. A combination of claim 20 including: means mounted on the liquid level indicator providing visual information as to the presence of water in the chamber.

22. The combination of claim 20 wherein: the surfaces are generally flat and located at angles relative to the longitudinal axis of the body in opposite portions of the form V-grooves in the opposite portions of the side walls of the body.

23. The combination of claim 22 wherein: the surfaces forming the V-grooves intersect the longitudinal axis of the body and locate the apexes of the grooves in overlapping relationship.

24. In combination, a structure having a generally horizontal passage for accommodating a liquid, an apparatus connected to the structure providing visual information of the level of liquid in the passage of the structure, said apparatus having a housing connected to the structure, said housing having an internal chamber open to said passage for holding liquid at the same level as the liquid in the passage, said housing having a top wall with an opening open to said chamber, a liquid level indicator located within the chamber having a transparent head, and a linear transparent body joined to the head, said body having a bottom end and a side wall between the head and the bottom end, means mounting the head on the top wall of the housing closing the opening therein and locating the body in a vertical position in the chamber, said side wall having a plurality of surfaces spaced along the body providing prismatic indentations for reflecting light laterally when exposed to as within the chamber and transmitting light along the transparent body when exposed to said liquid in the chamber, a concave surface at the second end of the body for reflecting the light transmitted through the body back through the body to provide visual information as to the presence of liquid in the chamber and level of said liquid in the chamber and passage of the structure and to enhance reading of the visual information of the level of liquid in the chamber.

25. The combination of claim 24 including: color means on the concave surface for providing color visual information regarding the level of liquid in the chamber.

\* \* \* \* \*